Jan. 13, 1925.

W. B. PETTIBONE 1,522,743

STORAGE BATTERY

Filed May 26, 1919

Inventor:
Ward B Pettibone
By Thurston Kwis + Hudson
attys.

Patented Jan. 13, 1925.

1,522,743

UNITED STATES PATENT OFFICE.

WARD B. PETTIBONE, OF CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY.

Application filed May 26, 1919. Serial No. 299,691.

*To all whom it may concern:*

Be it known that I, WARD B. PETTIBONE, a citizen of the United States, residing at Cleveland, in the county of Cuyahoga and State of Ohio, have invented a certain new and useful Improvement in Storage Batteries, of which the following is a full, clear, and exact description.

This invention relates to storage batteries and has for its chief object to obtain a secure mounting of the cell jars in the battery box and to prevent any relative lateral movement between the lower or upper parts of the jars.

The invention relates to the combination of a battery box, jars, and partitions designed to be forced in between the jars, or between the end jars and the ends of the battery box, the partitions being tapered so that when forced into place they effectively hold the jars for their full depth against relative movement.

The invention may be briefly summarized as consisting in certain novel details of construction and combinations and arrangements of parts which will be described in the specification and set forth in the appended claims.

Figure 1:
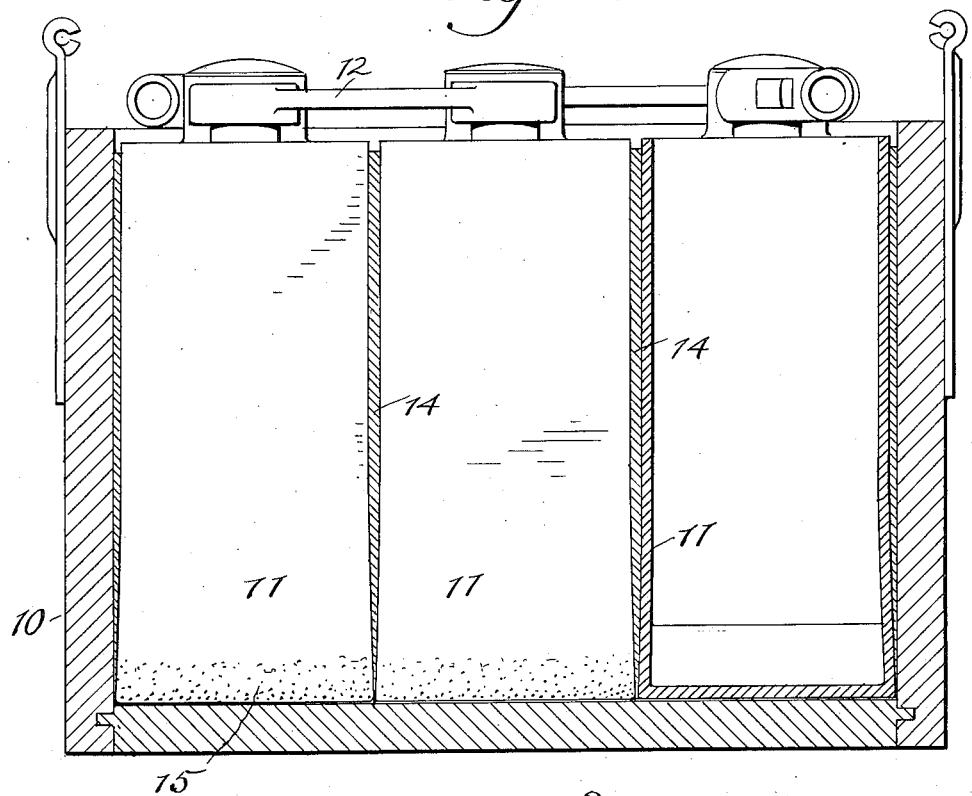
Figure 2:
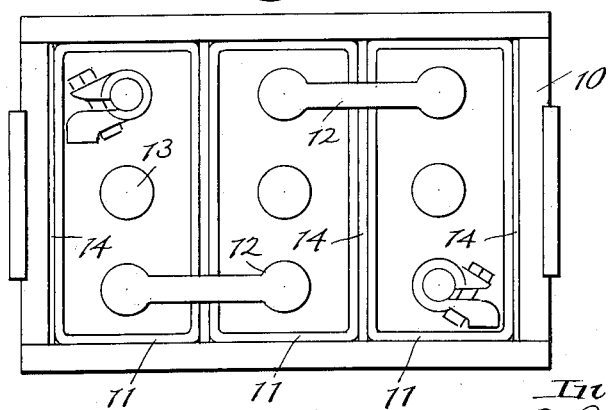

In the accompanying sheet of drawings illustrating the preferred form of the invention, Fig. 1 is a vertical sectional view through a battery constructed and arranged in accordance with my invention, parts being in elevation; and Fig. 2 is a plan view of the same on a reduced scale.

In the drawings, 10 represents the battery box, usually formed of wood, and in this box are arranged the cells which include jars 11, adapted to contain positive and negative elements and electrolyte as is customary. The connectors 12 which are attached to the terminal posts may assume any form, and the same is true of the vent plugs indicated at 13. The battery may consist of any number of cells, but in this instance, three are shown.

The principal feature of the present invention resides in the use of tapered partitions or fillers 14 which are preferably formed of wood, and which are forced down, preferably between the adjacent jars, and also between the endmost jars and the ends of the battery box. The tapered form of the partitions, which preferably extend the full width of the battery box and are of a depth slightly less than the depth of the jars, requires, if the desired holding action be obtained, that the space for the partitions be somewhat wider at the top of the battery box than at the bottom, and preferably this is obtained by the use of jars slightly wider at the bottom than at the top. It is not essential that the partitions be tapered for their full depth, for very good results are obtained by making the sides parallel or substantially parallel for a portion of their depth, and tapering for the remaining portion of their depth. It is not essential either, particularly in all batteries, that these tapered partitions be located both between adjacent jars and between the endmost jars and the ends of the battery box though that arrangement is generally preferred. In some instances the desired holding action is obtained by the use of these partitions between adjacent jars only. In other instances it may be necessary only to insert them between the endmost jars and the ends of the battery box.

When the cells are placed in the box the partitions are forced downward to a sufficient depth that all parts are tight, and the effect of this is to hold the parts against relative movement just as effectively at the bottom as at the top of the jars, a matter of considerable consequence in view of the rough usage to which storage batteries, particularly those on vehicles are subjected. The holding action can be enhanced by the use of glue or other adhesive which hardens on cooling and which may be placed while in a heated state, in the bottom of the box before the jars are inserted therein, and when the jars and partitions are placed in the box this adhesive is squeezed up along the sides for a short distance as indicated at 15. However, the use of this adhesive may, under certain circumstances at least, be dispensed with.

Having described my invention, I claim:

1. A storage battery composed of a battery box containing a plurality of cells having jars of slightly greater width at the bottom then at the top, and means for holding the jars tightly in place for substantially the full height of the jars, comprising a tapered partition inserted down along the side of a jar the partition being wider at the top than at the bottom.

2. A storage battery composed of a battery box containing a plurality of cells having jars of slightly greater width at the bottom than at the top, and tapered partitions wider at the top than at the bottom inserted between the jars of adjacent cells or between the jars of the endmost cells and the ends of the box or both.

In testimony whereof I hereunto affix my signature.

WARD B. PETTIBONE.